United States Patent
Tsai

(10) Patent No.: US 6,339,700 B1
(45) Date of Patent: Jan. 15, 2002

(54) DIAL DEVICE FOR STEERING WHEEL OF AN AUTOMOBILE

(75) Inventor: Huo-Lu Tsai, Taichung Hsien (TW)

(73) Assignee: Complex Instrument Technology Corp. (TW)

( * ) Notice: Subject to any disclaimer, the term of this patent is extended or adjusted under 35 U.S.C. 154(b) by 0 days.

(21) Appl. No.: 09/703,370

(22) Filed: Oct. 31, 2000

(51) Int. Cl.[7] ................................................. H04B 1/38
(52) U.S. Cl. ........................ 455/90; 455/345; 455/575; 455/566
(58) Field of Search .......................... 455/90, 345, 575, 455/566, 550, 346, 351, 347, 99; 74/492; 280/777, 778, 779; 224/276

(56) References Cited

U.S. PATENT DOCUMENTS

| | | | | |
|---|---|---|---|---|
| 4,455,454 A | * | 6/1984 | Umebayashi et al. | ....... 455/556 |
| 4,698,838 A | * | 10/1987 | Ishikawa et al. | ............ 455/569 |
| 4,885,762 A | * | 12/1989 | Suzuki et al. | ................ 455/565 |
| 5,319,803 A | * | 6/1994 | Allen et al. | ................. 455/566 |

* cited by examiner

Primary Examiner—Nguyen T. Vo
Assistant Examiner—John J Lee
(74) Attorney, Agent, or Firm—Connolly Bove Lodge & Hutz LLP

(57) ABSTRACT

A dial device for a steering wheel of an automobile includes a steering wheel having an annular frame, and an annular film keyboard tightly mounted on the annular frame of the steering wheel and having a connecting terminal connected to a wireless emitter so that the annular film keyboard supplies a pressing dial signal which can be transmitted to a main processor through the wireless emitter in a wireless transmission manner. In such a manner, the annular film keyboard co-operates with the steering wheel so that a driver can hold the steering wheel and can press the annular film keyboard so as to dial synchronously, thereby achieving a dial function.

6 Claims, 3 Drawing Sheets

DIAL DEVICE FOR STEERING WHEEL OF AN AUTOMOBILE

BACKGROUND OF THE INVENTION

1. Field of the Invention

The present invention relates to a dial device, and more particularly to a dial device for a steering wheel of an automobile co-operating with a mobile telephone.

2. Description of the Related Art

A conventional mobile telephone having a hand-free receiver in accordance with the prior art is mounted in an automobile so that the driver in the automobile can perform the dialogue function during driving the steering wheel of the automobile without having to hold the mobile telephone during driving.

However, the driver still has to press the press buttons on the mobile telephone for performing a dial function whereby the driver's hand has to leave the steering wheel so as to press the press buttons while the driver has to turn around his head to watch the numbers on the press buttons for dialing the correct telephone numbers so that the drive's view of sight will deviate the direction of travel of the automobile, thereby easily causing danger to the driver during driving.

SUMMARY OF THE INVENTION

In accordance with one aspect of the present invention, there is provided a dial device for a steering wheel of an automobile comprising:
  a steering wheel having an annular frame; and
  an annular film keyboard tightly mounted on the annular frame of the steering wheel and including a connecting terminal connected to a wireless emitter so that the annular film keyboard supplies a pressing dial signal which is transmitted to a main processor through the wireless emitter in a wireless transmission manner;
  wherein, the annular film keyboard co-operates with the steering wheel so that a driver can hold the steering wheel and can press the annular film keyboard so as to dial synchronously, thereby achieving a dial function.

The dial device further comprises a plurality of equally spaced elastic press button switches mounted on the annular film keyboard.

According to an embodiment of the present invention, the wireless emitter is bonded on the annular frame of the steering wheel by a snap member.

According to an embodiment of the present invention, the main processor is connected to a mobile telephone by an interface card.

In such a manner, the dial device is installed on the steering wheel whereby the driver can hold the steering wheel, and can press the press button switches of the annular film keyboard synchronously so as to perform the dial function so that the driver's hand does not have to leave the steering wheel for performing the dial function, thereby greatly enhancing the driver's safety during driving the steering wheel.

Further benefits and advantages of the present invention will become apparent after a careful reading of the detailed description with appropriate reference to the accompanying drawings.

DETAILED DESCRIPTION OF THE INVENTION

Figure 1:
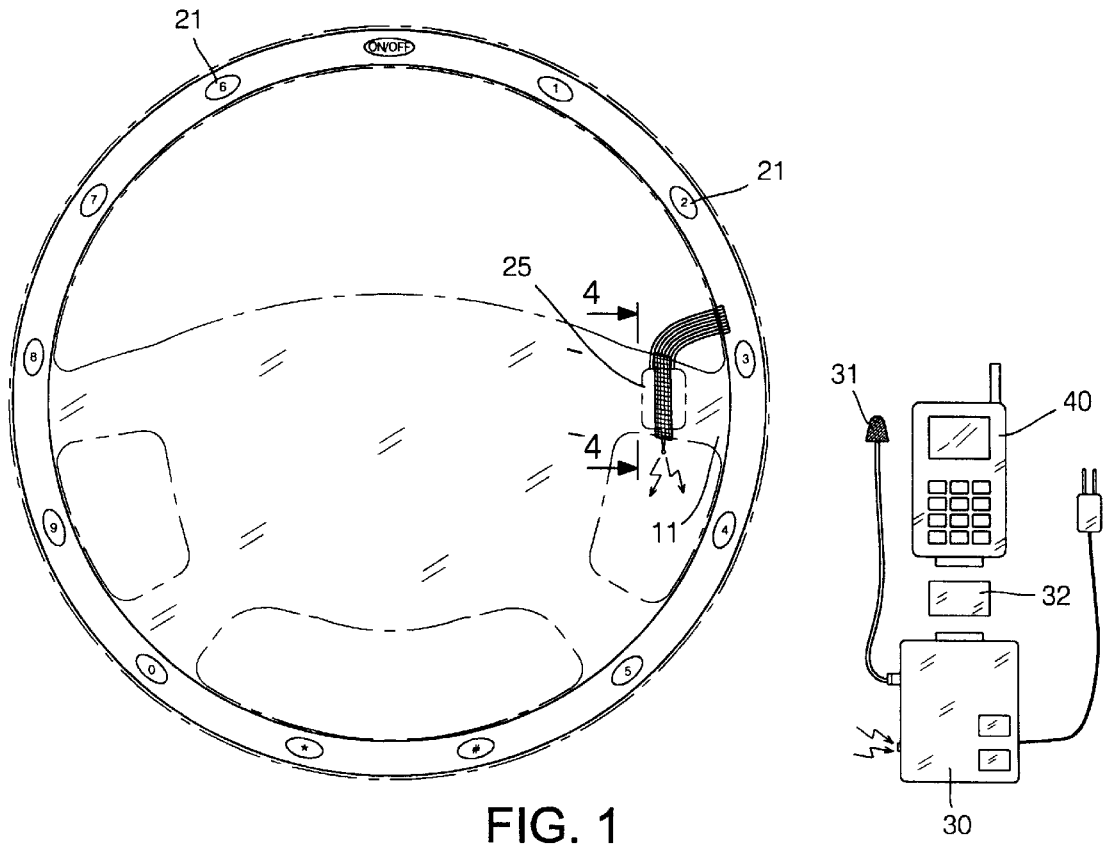
FIG. 1 is a schematic view of a dial device for a steering wheel of an automobile in accordance with the present invention.
Figure 2:
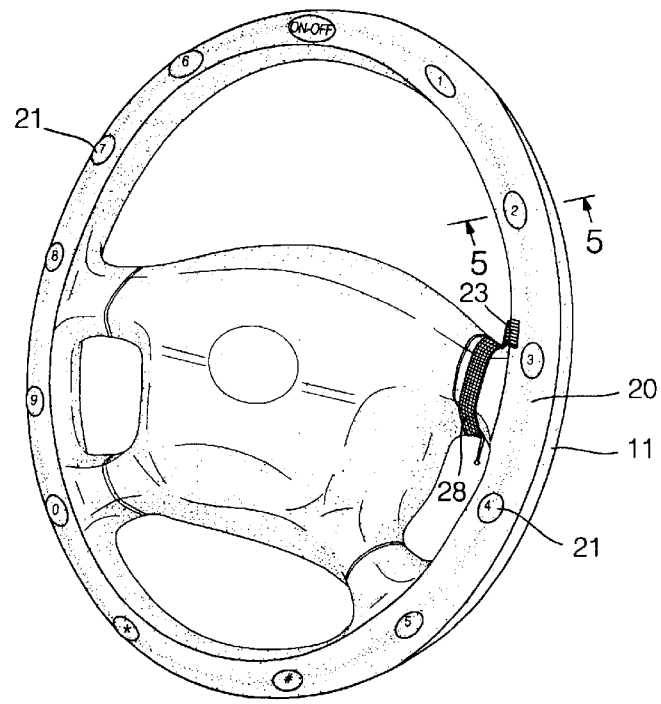
FIG. 2 is a perspective view of the dial device for a steering wheel of an automobile as shown in FIG. 1.
Figure 3:
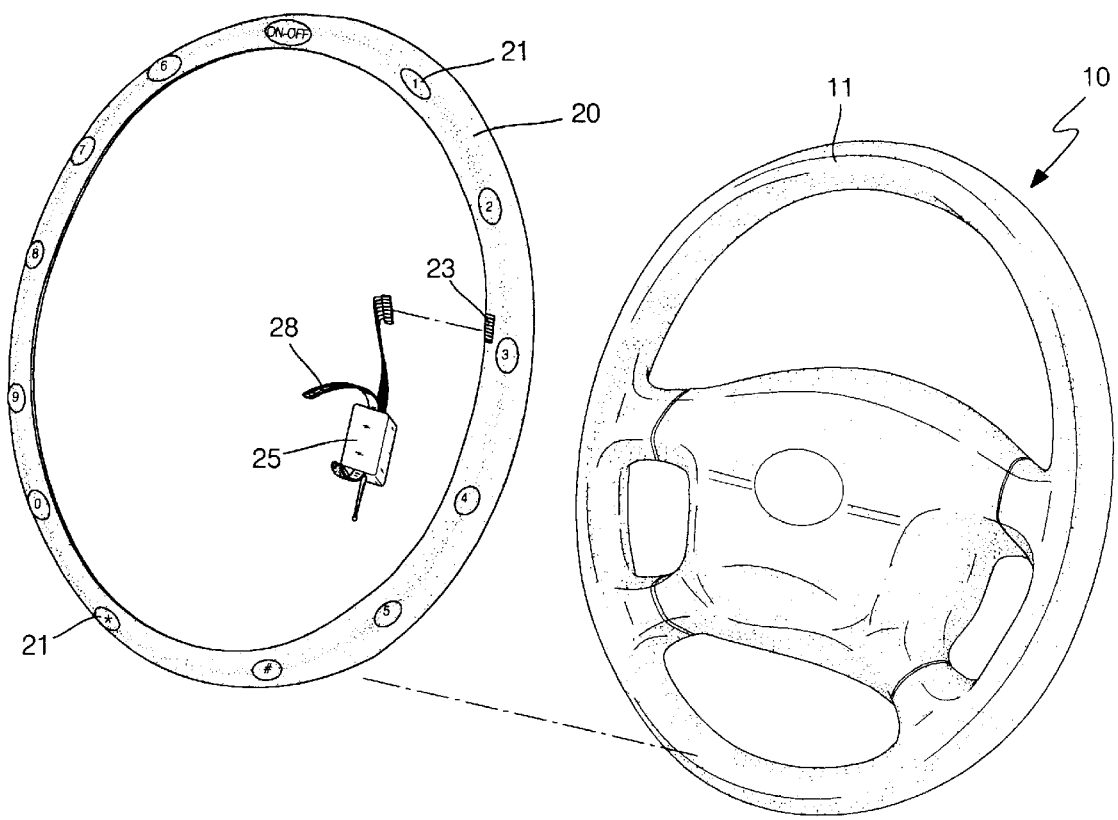
FIG. 3 is an exploded view of the dial device for a steering wheel of an automobile as shown in FIG. 2.
Figure 4:
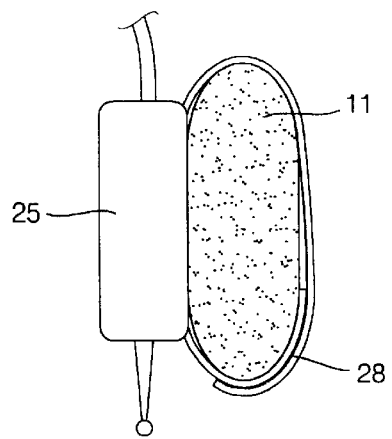
FIG. 4 is a cross-sectional view of the dial device for a steering wheel of an automobile along the line 4—4 as shown in FIG. 1.
Figure 5:
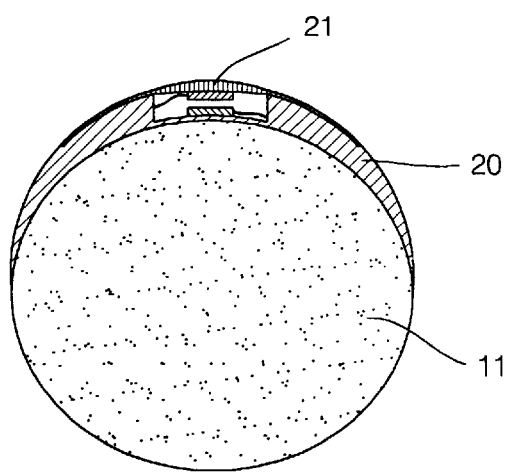
FIG. 5 is a cross-sectional view of the dial device for a steering wheel of an automobile along the line 5—5 as shown in FIG. 2, wherein the elastic press button switches are not pressed.
Figure 6:
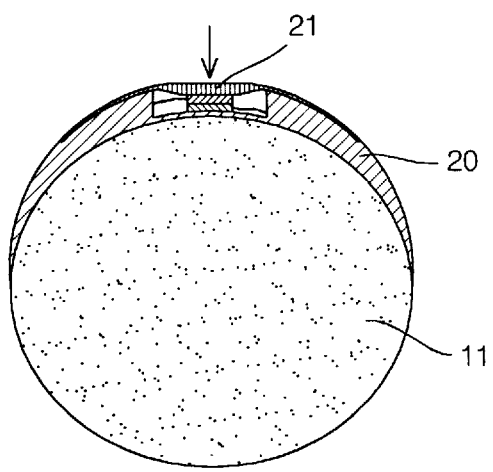
FIG. 6 is a cross-sectional view of the dial device for a steering wheel of an automobile along the line 5—5 as shown in FIG. 2, wherein the elastic press button switches are pressed.

Referring to FIGS. 1–6, a dial device for a steering wheel of an automobile in accordance with the present invention comprises a steering wheel 10 having an annular frame 11, and an annular film keyboard 20 tightly mounted on the annular frame 11 of the steering wheel 10 and including a connecting terminal 23 connected to a wireless emitter 25 so that the annular film keyboard 20 supplies a pressing dial signal which can be transmitted to a main processor 30 through the wireless emitter 25 in a wireless transmission manner.

The annular film keyboard 20 is a press button switch made of rubber material, and has a diameter substantially equal to that of the annular frame 11 of the steering wheel 10 so that the annular film keyboard 20 is tightly mounted on the annular frame 11 of the steering wheel 10. A plurality of equally spaced elastic press button switches 21 made of rubber material are mounted on the annular film keyboard 20 so as to function as dial keys of a telephone. By means of pressing the elastic press button switches 21, the annular film keyboard 20 can supply a pressing dial signal which is transmitted to the main processor 30 through the wireless emitter 25 in a wireless transmission manner.

In such a manner, the annular film keyboard 20 co-operates with the steering wheel 10 so that a driver can hold the steering wheel 10 and can press the elastic press button switches 21 of the annular film keyboard 20 so as to dial synchronously, thereby achieving a dial function.

Preferably, the wireless emitter 25 is bonded on the annular frame 11 of the steering wheel 10 by a snap member 28.

The main processor 30 is connected to a mobile telephone 40 by an interface card 32 and includes a microphone 31 and a loud speaker (not shown) so that the driver can perform the dialing function without having to hold a speaker and a receiver. The main processor 30 is preferably connected to the cigarette lighter (not shown) of the automobile for supplying electric power to the main processor 30 so as to receive the wireless dialing signals from the wireless emitter 25. The main processor 30 includes a signal processing circuit (not shown) which can be used to magnify audio signals and to process the signals.

In operation, the annular film keyboard 20 is tightly mounted on the annular frame 11 of the steering wheel 10 while the dial signals by pressing the elastic press button switches 21 of the annular film keyboard 20 is transmitted to the main processor 30 through the wireless emitter 25 so that when the driver holds the steering wheel 10 and watches the front road condition, he can also operates the elastic press button switches 21 of the annular film keyboard 20 synchronously so as to perform the dial and dialogue functions so that the driver's hand does not have to leave the steering wheel 10 for performing the dial function, thereby greatly enhancing the driver's safety during driving the steering wheel 10 so that the driver can manipulate the mobile telephone 40 easily and conveniently. In addition, the annular film keyboard 20 is mounted on the annular frame 11 of the steering wheel 10 so as to fit the driver's gesture, thereby satisfying the ergonomical requirements.

It should be clear to those skilled in the art that further embodiments may be made without departing from the scope of the present invention.

What is claimed is:

1. A dial device for a steering wheel of an automobile comprising:

a steering wheel (10) having an annular frame (11); and an annular film keyboard (20) tightly mounted on said annular frame (11) of said steering wheel (10) and including a connecting terminal (23) connected to a wireless emitter (25) so that said annular film keyboard (20) supplies a pressing dial signal which is transmitted to a main processor (30) through said wireless emitter (25) in a wireless transmission manner;

wherein, said annular film keyboard (20) co-operates with said steering wheel (10) so that a driver can hold said steering wheel (10) and can press said annular film keyboard (20) so as to dial synchronously, thereby achieving a dial function.

2. The dial device for a steering wheel of an automobile in accordance with claim 1, further comprising a plurality of equally spaced elastic press button switches (21) mounted on said annular film keyboard (20).

3. The dial device for a steering wheel of an automobile in accordance with claim 1, wherein said wireless emitter (25) is bonded on said annular frame (11) of said steering wheel (10) by a snap member (28).

4. The dial device for a steering wheel of an automobile in accordance with claim 1, wherein said main processor (30) can be used to magnify audio signals and to process signals.

5. The dial device for a steering wheel of an automobile in accordance with claim 1, wherein said main processor (30) is connected to a mobile telephone (40) by an interface card (32).

6. The dial device for a steering wheel of an automobile in accordance with claim 1, wherein said annular film keyboard (20) is a press button switch.

* * * * *